Sept. 23, 1969  A. R. RAUSING ET AL  3,468,224
METHOD OF FORMING A CONTAINER
Original Filed Feb. 28, 1966  2 Sheets-Sheet 1

INVENTORS
Anders Ruben Rausing
Rolf Lennart Ignell

BY Pierre Scheffler & Parker
ATTORNEYS

INVENTORS
Anders Ruben Rausing
Rolf Lennart Ignell

BY Prince, Scheffler & Parker
ATTORNEYS

United States Patent Office 3,468,224
Patented Sept. 23, 1969

3,468,224
METHOD OF FORMING A CONTAINER
Anders Ruben Rausing, Blentarp, and Rolf Lennart Ignell, Lund, Sweden, assignors to Sobrefina SA, Friebourg, Switzerland, a company of Switzerland
Original application Feb. 28, 1966, Ser. No. 530,525, now Patent No. 3,355,080, dated Nov. 28, 1967. Divided and this application Aug. 29, 1967, Ser. No. 664,202
Claims priority, application Sweden, Mar. 18, 1965, 3,493/65
Int. Cl. B31b 7/00; B65d 3/04, 3/22
U.S. Cl. 93—36.01   1 Claim

ABSTRACT OF THE DISCLOSURE

A composite container for goods and particularly goods having a high fat content comprises an outer cylindrical cardboard sleeve the bottom raw edge of which is turned inwardly and upwardly to space the edge from the supporting surface to minimize wicking, and a preformed cylindrical liner produced from a plastic film such as polyvinylchloride having close contact with the inner wall of the outer cardboard sleeve, the upper edge of the liner including an outwardly turned flange overlying the upper edge of the cardboard sleeve. The bottom of the liner may be dome-shaped or flat, and if flat must be made thicker than the side wall so as to resist deformation due to the weight of goods. The composite container is closed at the top by a cover which may be in the form of a flat disc, or the cover may be domed to provide an opening substantially smaller than the diameter of the liner, and which opening is then closed by a cap.

Figure 1:
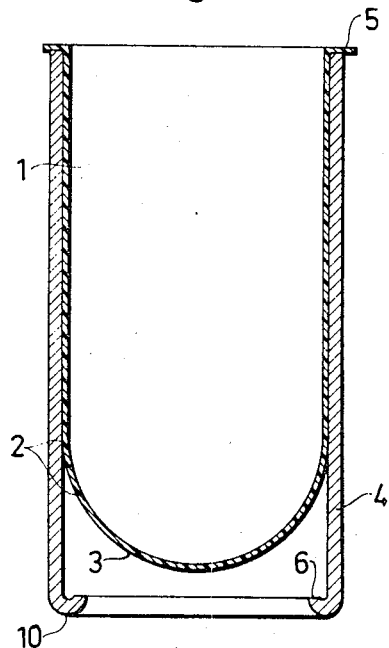
Figure 2:
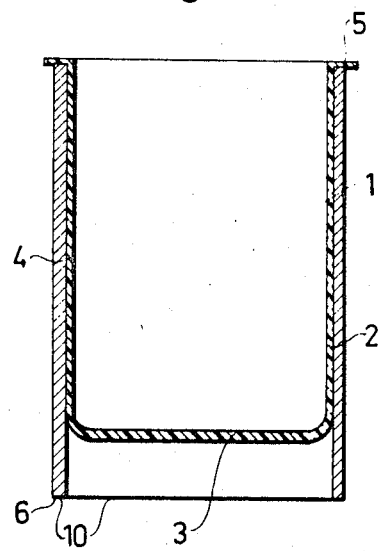

In assembling the cylindrical portion of the liner within the sleeve, which have essentially the same external and internal diameters, respectively, the sleeve is first moistened and since it is made from cardboard, absorption of moisture into the body of the sleeve causes it to expand and effect a temporary increase in its internal diameter sufficient to permit easy insertion of the preformed plastic liner. Following insertion of the liner, the sleeve is dried thus shrinking the same to its original size and simultaneously establishing a snug fit with the liner.

---

This application is a division of my co-pending application Ser. No. 530,525 filed Feb. 28, 1966, now Patent No. 3,355,080, issued No. 28, 1967 and is directed to the method of forming a container, the structure of which is claimed in the aforesaid co-pending application.

The present invention refers to a container of the kind including an inner relatively thin layer of material which is dense and resistant to the intended filling goods and an outer mechanically stiffer layer of material.

In the packaging art the problem often arises of packing goods which on account of their properties require special packaging materials. Goods of high fat content, for example table-oil, mayonnaise, butter etc., thus cannot be packed in jars of cardboard or similar material but must be packed in jars of a fat resistant material.

It is well-known to pack goods of the kinds here mentioned in jars or bottles of glass or plastic, but since these materials are relatively expensive or have other disadvantages, for example considerable weight and risk of crushing, packages have also been manufactured from cheaper materials, for example cardboard or paper, which have been coated with a thin layer of a suitable material resistant to the intended filling goods, for example wax or plastic. In the case of these latter packages the sealing and mechanically protecting functions of the packages have thus been allotted to two different materials, i.e. the sealing function is performed by a thin coating of for example plastic, while the mechanically protecting function is provided by means of a relatively stiff layer of cardboard or similar material.

When applying the multi-layer principle according to the above to jars of marmelade and syrup jar type the sealing coating up to now had to be applied to the interior of a pre-fabricated cardboard jar by submerging the jar into a wax bath or a plastic emulsion or by painting the jar on the inside with a plastic emulsion or a suitable lacquer.

Since the application of the sealing coating thus at present is associated with considerable difficulties and as it is often difficult by the methods indicated to obtain a dense, continuous inner coating it has long been desired to produce a package which does not display the disadvantages here mentioned.

The present invention provides a container which in respect of costs fully compares with jar packages as earlier known but which does not display the disadvantages of the latter. The container according to the invention is characterized by the fact that the inner layer thereof consists of a continuous lining having a tubular shell which at one end has an outwardly directed flange extending around the shell and a closed bottom portion at the other end, said bottom portion and flange being dimensioned in mechanical respect in such a way that without outer mechanical support, while maintaining a given shape, they are capable of taking up all stresses emanating from the filling goods introduced into the container both at the filling of the container and during normal transport and handling, while on the other hand the tubular shell is dimensioned in such a way that in order to maintain a given shape at normally occurring stresses emanating from the filling goods it must be supported by a mechanically relatively stiff tubular sleeve surrounding the shell part, said flange being adapted to rest on one edge of the sleeve defining one sleeve opening, while the bottom part of the container is situated within the opposite opening of the sleeve, the edge portion of which is adapted to form the foot of the container.

Figure 3:
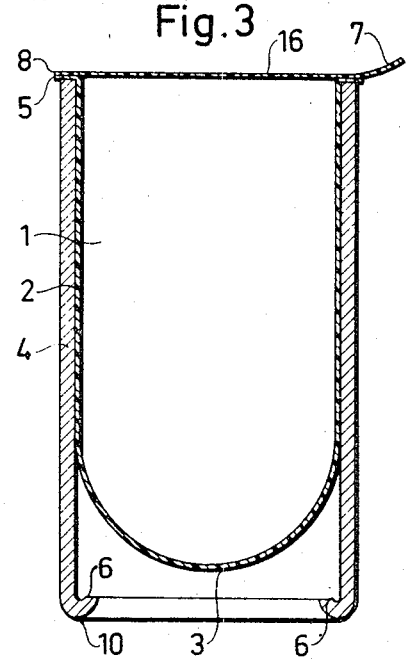
Figure 3A:
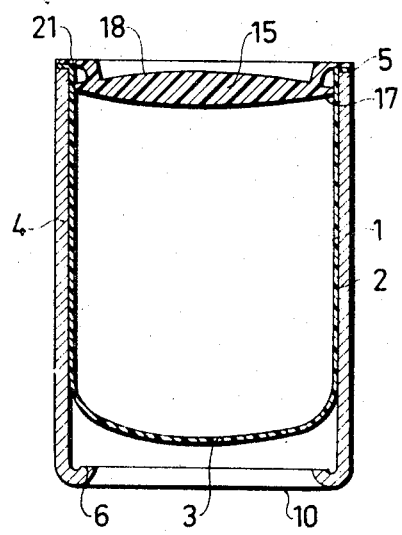
Figure 4:
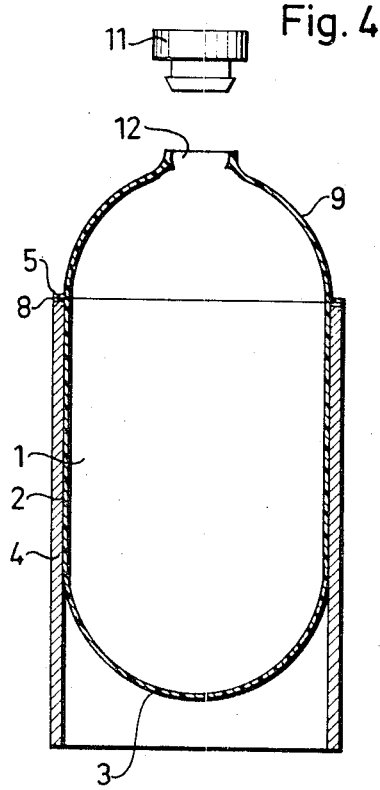
Figure 5:
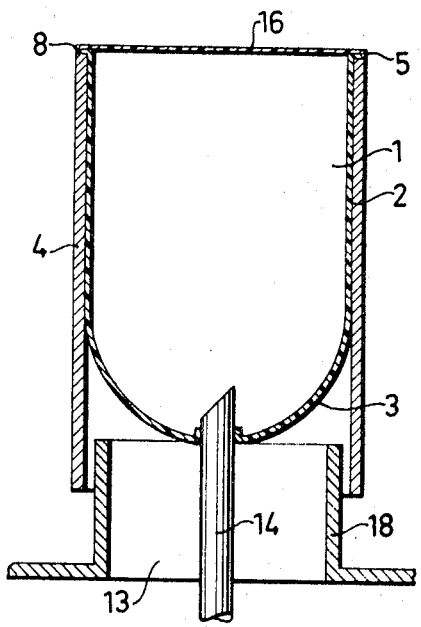
Figure 6:
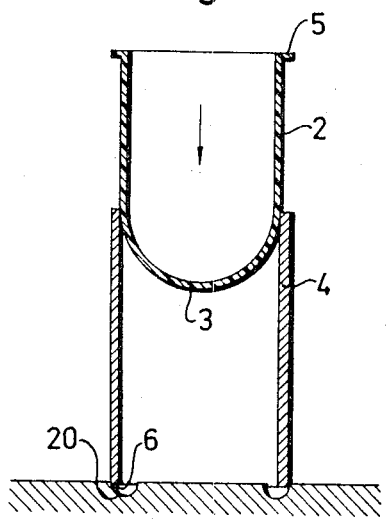
Figure 7:
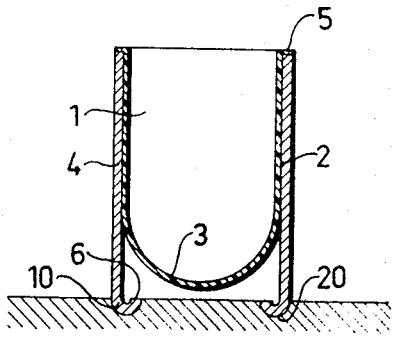

Some embodiments of the invention will be described in the following with reference to the accompanying diagrammatic drawing, in which:

FIGS. 1, 2, 3 and 3a show containers according to the invention in the form of jars, FIG. 4 shows a container of bottle shape, FIG. 5 shows how a container according to the invention is emptied of its contents, FIG. 6 shows how the lining part of the container is introduced into the sleeve part, and FIGS. 6 and 7 show how the foot of the container is formed.

The containers shown in FIGS. 1 to 3a, inclusive, are of the jar type, i.e. each has an emptying opening the cross-section of which does not at all or only slightly differs from the cross-section of the container body. The jar shown in FIG. 1 consists of a lining 1 of a packaging material which is dense and inert towards the filling goods. The lining 1 consists in the example shown of a circular-cylindrical shell part 2 which at one of its ends is closed by a bottom 3. This bottom will preferably have a spherical form, but other domed shapes may of course also be conceived. The other upper end of the shell 2 merges into an outwardly directed relatively narrow flange 5. The lining 1 is introduced into and preferably is fixed to a mechanically relatively stiff sleeve 4 of cardboard or similar material, the flange 5 of the lining 1 being adapted to rest on the upper edge of the sleeve 4 and the lower edge of the sleeve 4 being adapted to form the foot 10 of the container. To prevent wicking i.e. to prevent moisture from being sucked up into the cardboard sleeve through the lower cut i.e. raw edge 6 thereof, when the container is placed on a wet base, this cut edge is rolled up inwards to form flange 10, the said cut edge 6 of the sleeve 4 thereby avoiding coming into direct contact with the base. The flange 5 is adapted to cover the upper cut edge of the sleeve 4, direct contact between the filling goods and the sleeve edge being prevented even when the filling goods is poured out from the container.

The lining 1 may advantageously be deep-drawn by means of vacuum or pressure into the desired shape and will then have a substantially uniform wall thickness, or possibly a thinner shell part 2 depending on the depth of the container. The lining is produced from a plastic film which is moldable in heated condition but in cold condition is relatively stiff, e.g. polyvinylchloride, and it is dimensioned so that the bottom part 3 and the flange 5 have an intrinsic stiffness which is so great that these portions of the lining are not deformed or do not break when subjected to the normal stresses which are due to the filling goods or which are caused during normal handling and transport, while on the other hand the shell part 2 is dimensioned so that without exterior support it does not maintain its given shape when the filling goods is filled into the container, or when it is subjected to normal handling.

The container shown in FIG. 1 comprises, as stated above, a lining 1, which consists of a circular-cylindric shell part 2 and a domed bottom 3, which in the example shown approximately consists of a hemisphere. The domed, preferably spheric bottom shape is particularly suitable to satisfy the requirements in respect of deformation stiffness and strength, since this shape causes a distribution of the arising stresses favourable for the purpose. The circular-cylindrical form of the shell part 2, on the other hand, does not offer a corresponding favourable stress distribution. Thus, the shell part 2 may easily be deformed, if a pressure from the outside is applied, while on the other hand a domed bottom part of the same material displays a considerably better deformation stiffness. If the bottom part has not imparted to it the domed shape shown in FIG. 1, the wall thickness of the bottom part must be increased to a substantial extent, which is shown by the bottom 3' in FIG. 2.

The container shown in FIG. 3 is principally similar to the one shown in FIG. 1, but the container is provided with a disk 16 covering the opening of the container, being in engagement with and sealed at 8 against the flange 5 of the lining 1. To facilitate the opening of the container the disk 16 may be provided with a gripping flap 7 and furthermore the sealing may of course be carried out in such a way, that it may be torn open relatively easily.

As shown in FIG. 3a the container even can be closed by means of a lid 15 of plastic or similar flexible material. Said lid which is intended to be inserted into the opening of the container shall have a diameter which is somewhat larger than the diameter of the container opening. The lid 15 has a central lens-shaped part 18 which at its circumference is provided with a projecting relatively thin outwardly contracting edge 17 which when the lid 15 is pressed into the opening of the container presses the marginal zone of the lining 1 against the inside of the sleeve 4. If the sleeve 4 surrounding the lining 1 were lacking, the marginal zone of the lining 1 would be stretched without any deformation of the edge 17 of the lid 15. However it is desirable that the tightening pressure between the lid and the lining be so high that the edge of the lid will be slightly deformed. This deforming of the lid's edge is obtained by means of the sleeve 4 which prevents the stretching of the lining 1. In order to simplify the inserting of the lid 15 into the container opening the upper part of the lid is provided with a flange 21.

The container according to FIG. 1 may also, as shown in FIG. 4, be provided with a flanged part 9 which is intended to form the top of a bottle which is formed by the dome part 9 and the lining 1 after these parts have been united by means of a sealing joint 8 along the flanges 5. To facilitate the emptying of the bottle the top part 9 should preferably be provided with an opening 12 which may be closed by a cap 11. The bottle shown in FIG. 4 which has a top part 9 of domed shape has been chosen in the example shown in order to obtain the greatest possible stiffness of shape for a certain material, but it is of course possible to give the top part 9 any desired form.

The special formation of the container which is shown especially in FIG. 3 may in certain cases with advantage be emptied of its contents by breaking through the bottom 3 with some pointed object, preferably at the center of the bottom portion, whereupon the filling goods enclosed in the container is allowed to flow out through the hole formed at the breaking-through of the bottom. Thereby the container may be efficiently emptied of its contents, since all filling goods will tend to flow towards the lowest point of the container, i.e. where the emptying hole is provided. In this form the container is particularly adapted for example for table-oil or other materials in the case of which the whole amount of filling goods will be discharged at a single occasion. In FIG. 5 it is shown how a container according to the invention is guided with its outer sleeve 4 over the side wall 18 of a discharge tube 13. The container is pressed against a hollow point of a lance 14, which is caused to break through the central part of the bottom 3 of the container, the contents of the container flowing out through the discharge tube 13. To facilitate the emptying it is convenient to provide a venting hole in addition to the emptying hole to prevent under-pressure in the container.

The embodiments here shown of the container according to the invention are intended only to illustrate possible fields of utilization, and other fields of utilization are for example a non-return package for baby food, where the top or bottom part of the package may be provided with a nipple or similar means.

The invention also comprises the method of producing the container, which is characterized by the fact that a plastic film which is moldable in heated condition has imparted to it by pressure-forming or vacuum-drawing the prescribed shape of the container lining 1, whereupon said lining is introduced into a pre-fabricated mechanically stiff sleeve of e.g. cardboard, whose inner cross-sectional configuration substantially conforms to the outer configuration of a cross-section through the shell part of the lining.

The deep drawing or forming of the lining proceeds preferably in such a way that a plastic film, which in cold condition is relatively stiff but which is moldable in heated condition, for example polyvinylchloride, is heated by means of a special heater device, whereupon the heated part of the film is pressed by means of a mandrel into a molding space having an inner configuration which corresponds to the desired outer configuration of the lining 1. The heated plastic film is thereupon caused to engage the wall of said molding space, either by supplying a pressure gas against the inside of the lining material or by evacuating the space between the outside of the lining and the wall of the molding space.

The lining 1 is thereupon separated from the remainder of said plastic film by means of a cut around the opening of the lining, but at a distance of some millimeter from the latter, the container being then provided with the outwardly folded flange 5 running around its opening. When the lining has cooled and regained its stiffness, it is removed from the molding means and is introduced in the way shown in FIG. 6 into a pre-made sleeve 4 of for example cardboard or similar stiff material. To facilitate the introduction of the lining 1 into the sleeve 4 the latter, in the case where it consists of cardboard may be moistened to such extent that it swells, whereupon after drying it again shrinks into clinging engagement with the lining 1.

When the lining 1 is introduced into the sleeve 4 the latter is pressed against its base, which in the example shown presents an annular guiding groove 20 having a diameter which corresponds to the diameter of the sleeve 4. In FIG. 7 it is shown how the lower edge of the sleeve 4 when pressed against the base and guided by the annular guiding groove 20 is caused successively to fold or roll inwards to form an inwardly folded rolling flange 10.

The examples of the invention here described are intended only to illustrate the usefulness and adaptability of the invention to various types of packages and various filling goods, but one may of course conceive a great number of other examples or fields of employment of the container according to the invention.

The container according to the invention offers a great many advantages compared to other well-known containers, and among these advantages may be mentioned that the container is cheap to manufacture, that it has a lining which is mechanically stronger than the lining of such cardboard jars the inside of which is coated with wax or plastic, that the cut edges of the cardboard sleeve are protected against absorption of liquid, that the domed form of the bottom enables easier emptying (the filling goods cannot collect at an angle between the bottom and the side wall), that the carboard sleeve can be used with advantage to provide the container with information or advertising text, and that the container can easily be closed with a wafer by heat sealing along the flange of the lining.

We claim:
1. The method of forming a composite container structure comprising a preformed liner of relatively thin, flexible plastic material having a cylindrical body portion, a top flanged portion and a bottom portion, and an outer cylindrical sleeve of relatively stiff cardboard material which fits snugly around the cylindrical body portion of said liner and has a greater axial dimension than said liner, which comprises the steps of separately forming said liner and sleeve, the internal diameter of said sleeve being substantially equal to the external diameter of the cylindrical portion of said liner, moistening said sleeve thereby to effect a temporary expansion thereof including an enlargement of its diameter, inserting said cylindrical portion of said liner into said expanded sleeve until the top flange of said liner contacts the upper edge of said sleeve, the lower edge of said sleeve extending beyond the bottom portion of said liner and forming an inwardly folded rolling flange about the lower edge of said sleeve to prevent wicking action from taking place while also providing a stronger base for said composite container independently of said liner, and thereafter shrinking said sleeve by drying to effect a snug contact between the interior surface of said sleeve and the exterior surface of said cylindrical portion of said liner.

References Cited

UNITED STATES PATENTS 3,082,517   1/1963   Gaylord.

BERNARD STICKNEY, Primary Examiner